(12) United States Patent
Ellis et al.

(10) Patent No.: US 7,813,960 B2
(45) Date of Patent: Oct. 12, 2010

(54) SYSTEM AND METHOD OF GENERATING SERVICE PLANS FOR REFRIGERATION SYSTEMS

(75) Inventors: Casey P. Ellis, Naperville, IL (US); Richard P. Kovar, Villa Park, IL (US)

(73) Assignee: Hussmann Corporation, Bridgeton, MO (US)

( * ) Notice: Subject to any disclaimer, the term of this patent is extended or adjusted under 35 U.S.C. 154(b) by 953 days.

(21) Appl. No.: 11/173,677

(22) Filed: Jul. 1, 2005

(65) Prior Publication Data

US 2007/0005460 A1    Jan. 4, 2007

(51) Int. Cl.
*G07G 1/12*    (2006.01)
*H04M 1/24*    (2006.01)

(52) U.S. Cl. ...................................... 705/24; 379/1.01
(58) Field of Classification Search ................ 705/3, 705/24; 379/1.01
See application file for complete search history.

(56) References Cited

U.S. PATENT DOCUMENTS

| | | | |
|---|---|---|---|
| 6,067,522 A * | 5/2000 | Warady et al. ................. 705/2 |
| 6,208,974 B1 * | 3/2001 | Campbell et al. .............. 705/3 |
| 6,526,392 B1 * | 2/2003 | Dietrich et al. ............. 705/400 |
| 7,260,546 B2 * | 8/2007 | McIntyre et al. ............... 705/1 |
| 2002/0010613 A1 * | 1/2002 | Lallo ............................. 705/8 |
| 2002/0073012 A1 * | 6/2002 | Lowell et al. ................. 705/37 |
| 2002/0077855 A1 | 6/2002 | Rubenstein |
| 2002/0111832 A1 | 8/2002 | Judge |
| 2002/0128877 A1 | 9/2002 | Levit |
| 2002/0138335 A1 | 9/2002 | Palmer et al. |
| 2002/0169727 A1 | 11/2002 | Melnick et al. |
| 2004/0073457 A1 | 4/2004 | Kalies |
| 2004/0088200 A1 | 5/2004 | Adams |
| 2004/0172291 A1 * | 9/2004 | Knowlton ....................... 705/2 |
| 2005/0015278 A1 | 1/2005 | Ghouri |
| 2006/0190304 A1 * | 8/2006 | Kobayashi et al. ............. 705/4 |
| 2007/0112608 A1 * | 5/2007 | Avery et al. .................... 705/8 |
| 2008/0033745 A1 * | 2/2008 | Burchfield et al. ............. 705/1 |

OTHER PUBLICATIONS

Pricey Protection; Extended warranties mostly safeguard retailer profits. But sometimes they can be a good idea.(Business) Dec. 19, 2004.*

Michael C. Budden, PhD and Robert C. Lake, PhD; University Catalogues and HMO Co-Payments: Simple Lessons in Economic Rationing; Health Marketing Quarterly; 1990; pp. 27-30; vol. 8(1/2); The Haworth Press, Inc.

(Continued)

*Primary Examiner*—Matthew S Gart
*Assistant Examiner*—Oluseye Iwarere
(74) *Attorney, Agent, or Firm*—Michael Best & Friedrich LLP

(57) ABSTRACT

A service plan system includes a computer program with a plurality of modules operable to generate service plans for refrigeration systems customers. The service plans offer multiple coverage levels, as well as various co-pay options (e.g., lower monthly fixed payment with higher event co-pay or higher monthly fixed payment with lower event co-pay) with increased controllable variable cost (e.g., high event co-pay). The different coverage levels provide options to the customer to select the program that provides the greatest opportunity for overall savings, while requiring active program participation by the service provider and the customer to maximize potential savings.

19 Claims, 10 Drawing Sheets

OTHER PUBLICATIONS

Michele Raddish, MD, MPH; Susan D. Horn, PhD; and Phoebe D. Sharkey, PhD; Continuity of Care: Is It Cost Effective?; The American Journal of Managed Care; Jun. 1999; pp. 727-734; vol. 5 No. 6.

Brenda R. Motheral, PhD and Rochelle Henderson, MPA; The Effect of a Copay Increase on Pharmaceutical Utilization, Expenditures, and Treatment Continuation; The American Journal of Managed Care; Nov. 1999; pp. 1383-1394; vol. 5 No. 11.

A. Mark Fendrick, MD; Dean G. Smith, PhD; Michael E. Chernew, PhD; and Sonali N. Shah, MBA, MPH; A Benefit-Based Copay for Prescription Drugs: Patient Contribution Based on Total Benefits, Not Drug Acquisition Cost; The American Journal of Managed Care; Sep. 2001; pp. 861-867; vol. 7 No. 9.

Brenda Motheral, RPH, MBA, PhD and Kathleen A. Fairman, MA; Effect of a Three-Tier Prescription Copay on Pharmaceutical and Other Medical Utilization; Medical Care Official Journal of the Medical Care Section, American Public Health Association; Dec. 2001; pp. 1293-1304; vol. 39 No. 12; Lippincott Williams & Wilkins.

Michael A. Kaszubski and Steve Ebben; Using activity-based costing to implement behavioural cost initiatives successfully; Journal of Facilities Management; Sep. 2004; pp. 184-192; vol. 3 No. 2; Henry Stewart Publications.

* cited by examiner

Entity Identification — 56

Area A Locations / 58

352 Grocery, 27 Combo, 113 Drug Store / 62

54

|  | Plan Option One<br>Total Assurance<br>Coverage | Plan Option Two<br>Total Assurance<br>Coverage | Plan Option Three<br>Total Assurance<br>Coverage | Plan Option One<br>Total Assurance<br>Coverage | Plan Option Two<br>Total Assurance<br>Coverage | Plan Option Three<br>Total Assurance<br>Coverage | Plan Option One<br>Total Assurance<br>Coverage |
|---|---|---|---|---|---|---|---|
|  | 352 Grocery Stores | 352 Grocery Stores | 352 Grocery Stores | 27 Combo Stores | 27 Combo Stores | 27 Combo Stores | 113 Drug Stores |
| Monthly Fee | $1,300 | $1,500 | $1,700 | $1,600 | $1,800 | $2,000 | $450 |
| Event Co-Pay | $300 | $250 | $200 | $300 | $250 | $200 | $125 |

70 — Monthly Fee row
74 — Event Co-Pay row

Additional charge applicable to above co-pay schedule on service calls received/performed after normal working hours: $50 for overtime/$100 for holiday (Applicable to all Plan Options)   — 78

OPTIONS: (Restrictions apply):
- Optional discounted event co-pay, based on cyclical reduction in annual event experiences.
- Optional Flex Pay for monthly fee (applicable to all Plan Options see attached example)
- Optional consolidated monthly fee invoice/statement available.
- Optional Centralized National Dispatch.

— 82

NOTES:
- 30-day event co-pay warranty covering new materials and workmanship (Coverage applies to all Plan Options).
- Assurance Plan pricing contingent upon 60-day evaluation/repair period at start of program, to ensure store equipment performance level meets customer specification levels (required/approved work to be performed on T/M basis).
- Basic contract terms apply to above plan prices (estimates), with contract terms and implementation requiring final legal review and approval.

Applicable charges for billable work not covered in program are detailed below:

Hourly Service Charges:
$70.00/hour (straight time)
$105.00/hour (overtime)
$140.00/hour (holidays)

Material Markup:
Branch base selling cost plus 35%

Truck Charge:
Service truck charge per dispatched call $40.00

Entity Identification — 96

— 118

| Month | 1(J) | 2(F) | 3(M) | 4(A) | 5(M) | 6(J) | 7(J) | 8(A) | 9(S) | 10(O) | 11(N) | 12(D) | Total |
|---|---|---|---|---|---|---|---|---|---|---|---|---|---|
| Plan Option One (Example) | | | | | | | | | | | | | |
| Plan One Monthly Fee | $1,300 | $1,300 | $1,300 | $1,300 | $1,300 | $1,300 | $1,300 | $1,300 | $1,300 | $1,300 | $1,300 | $1,300 | $15,600 PLUS Co-Pay |
| Event Co-Pay | $300 | $300 | $300 | $300 | $300 | $300 | $300 | $300 | $300 | $300 | $300 | $300 | |
| Plan One FlexPay Monthly Fee | $1,000 | $1,000 | $1,000 | $1,600 | $1,600 | $1,600 | $1,000 | $1,000 | $1,000 | $1,600 | $1,600 | $1,600 | $15,600 PLUS Co-Pay |
| Event Co-Pay | $300 | $300 | $300 | $300 | $300 | $300 | $300 | $300 | $300 | $300 | $300 | $300 | |
| Plan Option Three (Example) | | | | | | | | | | | | | |
| Month | 1(J) | 2(F) | 3(M) | 4(A) | 5(M) | 6(J) | 7(J) | 8(A) | 9(S) | 10(O) | 11(N) | 12(D) | Total |
| Plan Three Monthly Fee | $1,700 | $1,700 | $1,700 | $1,700 | $1,700 | $1,700 | $1,700 | $1,700 | $1,700 | $1,700 | $1,700 | $1,700 | $20,400 PLUS Co-Pay |
| Event Co-Pay | $200 | $200 | $200 | $200 | $200 | $200 | $200 | $200 | $200 | $200 | $200 | $200 | |
| Plan Three FlexPay Monthly Fee | $1,300 | $1,300 | $1,300 | $2,100 | $2,100 | $2,100 | $1,300 | $1,300 | $1,300 | $2,100 | $2,100 | $2,100 | $20,400 PLUS Co-Pay |
| Event Co-Pay | $200 | $200 | $200 | $200 | $200 | $200 | $200 | $200 | $200 | $200 | $200 | $200 | |
| Plan Option Combined (Example) | | | | | | | | | | | | | |
| Month | 1(J) | 2(F) | 3(M) | 4(A) | 5(M) | 6(J) | 7(J) | 8(A) | 9(S) | 10(O) | 11(N) | 12(D) | Total |
| Flex Pay Plan Option Combined Monthly Fee | $1,300 | $1,300 | $1,300 | $2,100 | $2,100 | $2,100 | $1,000 | $1,000 | $1,000 | $1,600 | $1600 | $1,600 | $18,000 PLUS Co-Pay |
| Event Co-Pay | $200 | $200 | $200 | $200 | $200 | $200 | $300 | $300 | $300 | $300 | $300 | $300 | |

(Plan One Flex Pay)

(Plan Three Flex Pay) ← 120

FIG. 7

Entity Identification — 124

| | 500 Store (minimum) Total Assurance Coverage Plan Option A | 750 Store (minimum) Total Assurance Coverage Plan Option B | 1,000 Store (minimum) Total Assurance Coverage Plan Option C | 1,500 Store (minimum) Total Assurance Coverage Plan Option D | 2,000 Store (minimum) Total Assurance Coverage Plan Option E |
|---|---|---|---|---|---|
| Monthly Fee* | $400 | $400 | $375 | $350 | $350 |
| Event Co-Pay | $150 | $140 | $130 | $125 | $120 |

Additional charge applicable to above co-pay schedule on service calls received/performed after normal working hours: $50 for overtime/$100 for holiday (Applicable to all Plan Options)

OPTIONS:
- Optional consolidated monthly fee invoice/statement available.
- Optional discounted event co-pay, based on cyclical reduction in annual event experiences.

NOTES:
- *Monthly Fee includes performance of two (2) scheduled (Fall and Spring) refrigeration equipment PMs and four (4) scheduled (quarterly) HVAC PMs.
- 30-day event co-pay warranty covering new materials and workmanship (Coverage applies to all Plan Options).
- Standard Full Maintenance Contract Terms apply to above plan prices, with final contract terms and implementation requiring final legal review and approval.
- Plan option prices exclude coverage of compressors in excess of ten (10) years old and Acts of God.

FIG. 8

126 — Entity Identification — 152

| | 500 Store (minimum) Total Assurance Coverage Plan Option A | 750 Store (minimum) Total Assurance Coverage Plan Option B | Estimated Savings at store minimum (from baseline) 1,000 Store (minimum) Total Assurance Coverage Plan Option C | 1,500 Store (minimum) Total Assurance Coverage Plan Option D | 2,000 Store (minimum) Total Assurance Coverage Plan Option E |
|---|---|---|---|---|---|
| 154 — Call Reduction (One per store annually) | $75,000 | $105,000 | $130,000 | $187,500 | $240,000 |
| 158 — Monthly Savings (baseline) | N/A | N/A | $300,000 | $900,000 | $1,200,000 |
| 162 — Co-Pay (baseline) | N/A | $52,500 | $140,000 | $262,500 | $420,000 |
| 166 — Total Potential Savings (baseline) | $0 | $52,500 | $440,000 | $1,162,500 | $1,620,000 |

Additional charge applicable to co-pay schedule on service calls received/performed after normal working hours: $50 for overtime/$100 for holiday (Applicable to all Plan Options).

170 { Managed reduction of one event annually at each  Increased Plan Participation Commitment with
   Total Potential Annual Savings                    Total Potential Annual Savings
   $75,000 - $240,000                                $52,500 - $1,620,000

SYSTEM AND METHOD OF GENERATING SERVICE PLANS FOR REFRIGERATION SYSTEMS

BACKGROUND

Sometimes, customers that purchase equipment from a manufacturer also purchase a service plan for the equipment. Equipment may need servicing at sometime during its lifetime. A pre-established service plan can provide a safety net in times of equipment malfunction.

Those customers that do purchase service plans often request that service costs and monthly out-of-pocket costs be minimized. However, at the same time, customers expect to receive an all-inclusive maintenance and service plan.

SUMMARY

Embodiments of the present invention relate to a service program to facilitate and create an environment to drive behaviors that benefit service providers and customers through the reduction of overall service activity and associated costs. The service program can provide coverage for defined contract elements for a reduced pre-established monthly fee and an additional predetermined event co-pay charge per service request.

The service program consolidates service calls and eliminates nuisance service requests. The service program also provides benefits to the service provider and customer as a result of the reduction of the number of service calls and associated expenses (e.g., travel time, truck charges, setup, invoicing processes and approval, etc.). The service program offers multiple coverage levels, as well as various co-pay options (e.g., lower monthly fixed payment with higher event co-pay or higher monthly fixed payment with lower event co-pay) with increased controllable variable cost (e.g., high event co-pay). The different coverage levels provide options to the customer to select the program that provides the greatest opportunity for overall savings, while requiring active program participation by the service provider and the customer to maximize potential savings.

In one embodiment, the invention provides a computer-implemented method of generating a service plan for a refrigeration system customer. The method includes the act of acquiring customer type data, customer location data, and customer service history data. The method also includes the act of analyzing the customer type data, customer location data, and customer service history data. The method further includes the act of generating a service plan report including a monthly fee amount and an event co-pay amount. The method also includes the acts of analyzing the service plan report and generating a service plan analysis report including a controllable variable service cost amount and a total potential savings amount.

In another embodiment, the invention provides, a computer program embodied by a computer readable medium capable of being executed by a computer. The computer program is operable to generate a service plan for a refrigeration system customer. The computer program includes instructions to acquire customer type data, customer location data, and customer service history data. The computer program also includes instructions to analyze the customer type data, customer location data, and customer service history data. The computer program further includes instructions to generate a plurality of service plans based on the analysis of the customer type data, customer location data, and customer service history data, each service plan providing a different monthly fee amount and different event co-pay amount based on the customer type data.

In another embodiment, the invention provides, a service plan generation system for refrigeration system customers. The service plan generation system includes a customer type module operable to acquire data related to customer type. The system also includes a service history module operable to acquire data related to the customer's service history. The system further includes a location module operable to acquire data related to the customer's location.

The system also includes a service plan coverage module operable to receive the data from the customer type module, the service history module, and the location module and to generate a service plan report and an analysis module operable to analyze the service plan report and to generate a service plan analysis report including a controllable variable service cost amount and a total potential savings amount.

Other aspects of the invention will become apparent by consideration of the detailed description and accompanying drawings.

BRIEF DESCRIPTION OF THE DRAWINGS

FIG. 3 is a service plan report generated by the service plan system illustrated in FIG. 1.

FIG. 7 is a service plan option report generated by the service plan system illustrated in FIG. 1.

FIG. 8 is a service plan report generated by the service plan system illustrated in FIG.

FIG. 9 is a service plan analysis report generated by the service plan system illustrated in FIG. 1.

DETAILED DESCRIPTION

Figure 1:
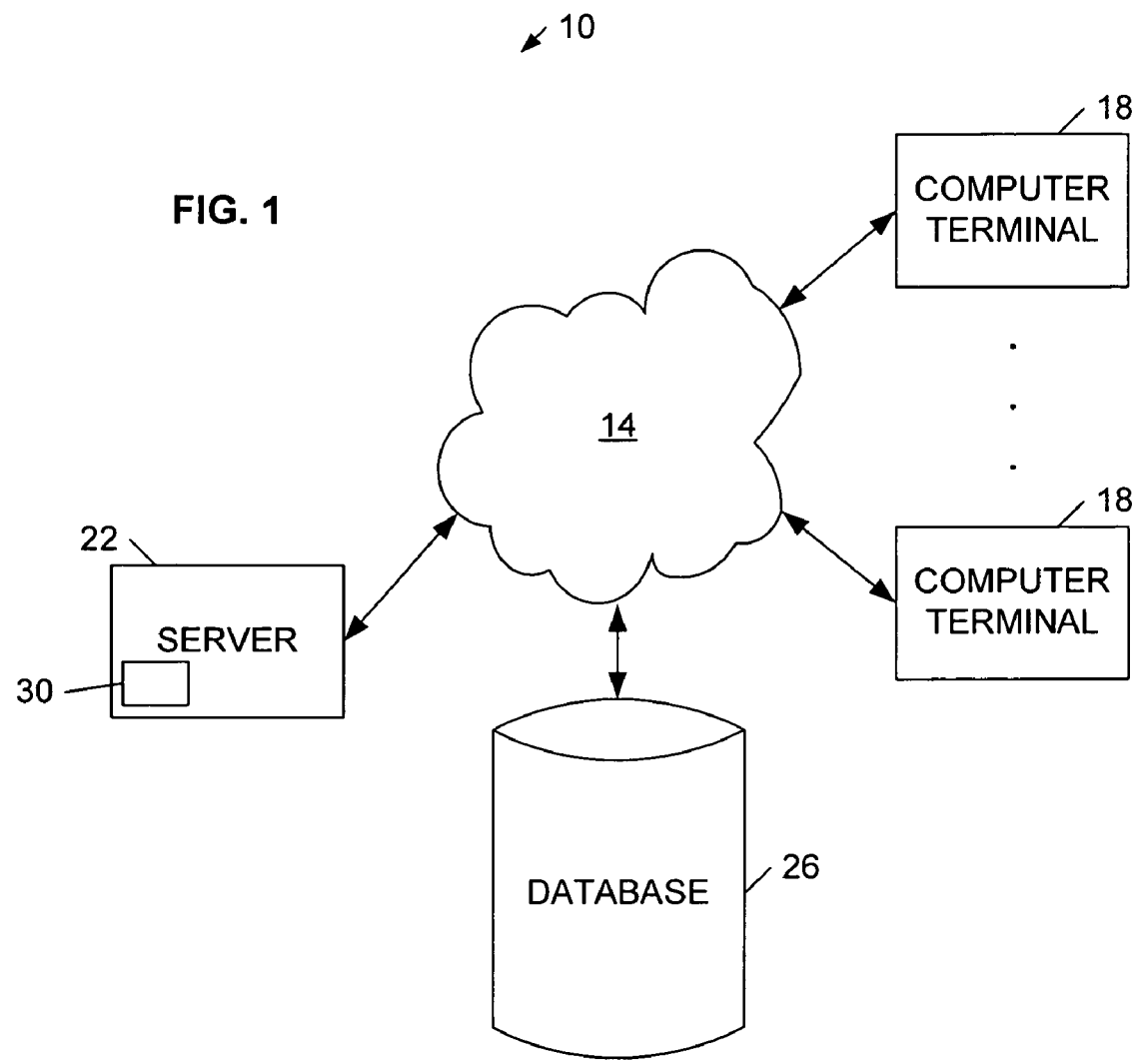
FIG. 1 is a schematic illustration of a service plan system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings, respectively. Further, "connected" and "coupled" are not restricted to physical or mechanical connections or couplings.

In addition, it should be understood that embodiments of the invention include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software. As such, it should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible.

One embodiment relates to computer programs for developing a custom service program for refrigeration customers. Each customer and its needs are unique; therefore, a customized service plan benefits the customer and the service provider. The service programs generally are designed to lower monthly budgeted fixed costs and manage controllable variable service costs. The customer and the service provider share the responsibility to reduce overall service expenses for refrigeration systems. These programs provide improved service mechanic productivity and reduced service expenses on unnecessary or nuisance calls.

The ability of a customer to save on service costs as a result of a reduction in the number of service calls provides additional funds to purchase additional or new refrigeration systems. The predictable savings also provide justification for capital investment to improve under-performing facilities and achieve a faster return on investment.

FIG. 1 schematically illustrates a service plan system 10. The service plan system 10 includes a network 14, a computer terminal 18, a server 22, and a database 26. The network 14 can be built using known networking technology or topology or combinations of technologies and topologies and can include multiple sub-networks. Connections between the computers and systems shown in FIG. 1 can be made through local area networks ("LANs"), wide area networks ("WANs"), public switched telephone networks ("PSTNs"), Intranets, the Internet, or other networks.

The computer terminal 18 includes an operating system for running various software programs and/or a communications application. The computer terminal 18 also includes typical hardware such as a processor, I/O interfaces, and storage devices or memory. The computer terminal 18 can also include input devices such as a keyboard and a mouse. The computer terminal 18 can further include standard output devices, such as a monitor. In addition, the computer terminal 18 can include peripherals, such as a printer and a scanner. It is noted that the service plan system 10 can include a plurality of computer terminals 18. The computer terminals 18 may include the same hardware and/or software, but this is not required. Each computer terminal 18 could include different hardware and/or software.

Like the computer terminals 18, the server 22 can include an operating system for running various software programs and/or a communications application. When configured in a client-server manner, the software programs can be manipulated by the computer terminals 18 enter, review, process, and/or save information. In particular, the server 22 can include a software program(s) 30 (e.g., Microsoft® Excel® spreadsheet program) that is operable to be accessed by the computer terminal 18. It is noted that the software program 30 could also reside on the computer terminal 18.

The database 26 can store information related to service plans or any other desirable information. The database 26 can be accessed directly by the computer terminal 18 or via the network 14. It is noted that a plurality of databases 26 can be incorporated in the service plan system 10.

The two-way arrows in FIG. 1 generally represent two-way communication and information transfer between the network 14 and any one of the computer terminals 18, the server 22, and the database 26. However, in some systems 10, only one-way communication and information transfer may be necessary.

Figure 2:
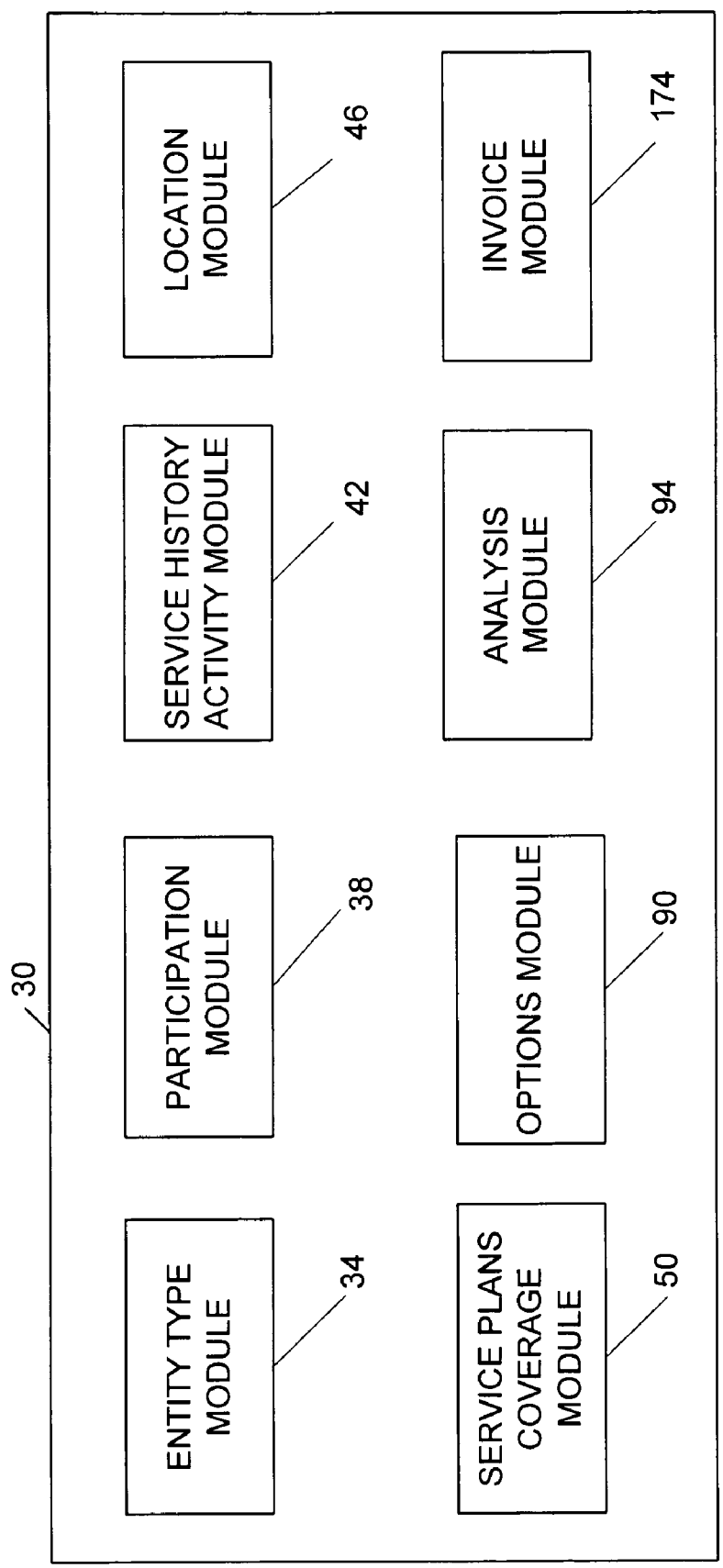
FIG. 2 is a schematic illustration of a software program used by the service plan system illustrated in FIG. 1.

As shown in FIG. 2, the software program 30 may include a plurality of instructions that function to request input data, process the input data, and output results. The instructions are organized in a plurality of modules, which are operable to interact with one another as necessary. Generally, the software program 30 acquires data related to, but is not limited to, the number of entities participating, the type of entities, historical service call information, monthly service plan cost, and service call event co-pay, processes the acquired data to generate a plurality of service plan options for a customer, and generates a report describing the service plan options.

The software program 30 includes a user interface, which generates a plurality of graphical screens viewable by a user. The user interacts with the user interface to enter, retrieve, save, review, and edit data and to instruct the software program 30 to process data in order to generate a service plan report. The user interface can include any number of screens for the user to interact with to generate and obtain the service plan report.

The software program 30 includes an entity type module 34 operable to identify or categorize the entity or entities participating in the service plan. The entity type module 34 can be used for any industry desirable of providing service plan options for its customers. For example, the entity type can describe different types of stores, e.g., grocery store, drug store, department store, hardware store. The entity type module 34 can generate screens to display to the user on the computer terminal 18 in order for the user to select an entity type. One of the screens can include a plurality of blanks that can be filled in by the user or can include a predetermined list of entity types that can be selected by the user.

The software program 30 also includes a participation module 38 operable to acquire the number of entities participating in the service plan. The participation module 38 can generate screens to display to the user on the computer terminal 18 for the user to select the number of entities participating in the service plan. One of the screens can include a plurality of blanks that can be filled in with a numerical value by the user or can include a predetermined list of quantities, e.g., 1-50, 1-100, 50-100. Generally, a customer can maximize its potential savings on service and maintenance by including many entities in the service plan.

The software program 30 also includes a historical service activity module 42 operable to acquire previous data related to service and maintenance. The data can include information, such as, for example, product serial and model numbers, dates of service, locations, cost, the name of the service person, and the length of the service call. The historical service activity module 42 can generate screens to display to the user on the computer terminal 18 for the user to enter or upload data related to previous service activity. One of the screens can include a plurality of blanks that can be filled in with information by the user or can include predetermined lists of information from which the user can select appropriate values or input. The user of the software program 30 can manually enter the service activity of a customer using the historical service activity module 42. Alternatively, service activity of a customer can be uploaded from another computerized system.

The software program 30 further includes a location module 46 operable to receive location information for each participating entity. The location module 46 analyzes location information for the participating entities and generates regional data that can be used for regional service plans. The location module 46 can determine the location of the nearest service center and compare the number of entities in a particular location to determine which entities are in each regional service plan. The location module 46 can generate screens to display to the user on the computer terminal 18 for the user to enter location data for each entity. One of the screens can include a plurality of blanks that can be filled in with information by the user or can include predetermined lists of information from which the user can select the appropriate information.

The software program 30 also includes a service plans coverage module 50 operable to generate a plurality of different service plans for an entity or group of entities based on the data input to the software program 30. The service plans coverage module 50 can generate a list of service plans and can display or generate a report of the service plans in a manner in which the plans can be compared to one another. The service plans coverage module 50 determines the fees and costs involved in each service plan option. For example, the service plans coverage module 50 can determine the monthly fee and the co-pay fee for each service plan. The fees and costs are based on the type of entity data from the entity type module 34, the number of entities participating in the service plan data from the participation module 38, previous service activity data from the service history activity module 42, and/or the location of the entities data from the location module 46.

FIG. 3 illustrates a sample service plans report 54 generated by the service plans coverage module 50. The report 54 includes an entity identification section 56, which identifies the entity for which the service plans report 54 was generated. The report 54 also includes a location section 58 that indicates the regional location applicable for the service plans. The report 54 also includes an entity type section 62, which indicates the type of entities used to generate the service plans. The report 54 also includes a service plans section 66, which includes a plurality of service plans 68. Each service plan 68 in the service plans section 66 is divided into a monthly fee section 70 and an event co-pay section 74. The sample report 54 illustrates seven different service plans to select from.

The report 54 also includes a conditions section 78, which indicates various conditions of the service plans 68. For example, the sample report 54 indicates that the entity will incur additional costs if service activity occurs after normal working hours or on holidays. The report 54 also includes an options section 82, which indicates whether any other options or programs are available to reduce costs for service (further described below). The report 54 further includes a notes section 86, which provides information to a sales or service representative when working with an entity to select the appropriate service plan 68.

The software program 30 also includes a service plans options module 90 (illustrated in FIG. 2) operable to generate a list of options available for each or all of the service plans 68, such as, for example, add-on services, additional payment options, and discounts. The service plans options module 90 generates the options section 82 on the report 54 in FIG. 3 and a service plan option report (described below).

The software program 30 also includes an analysis module 94 operable to analyze the service plans generated by the service plans coverage module 50 and to generate a report 98 indicating the potential savings for each service plan. The analysis module 94 utilizes assumptions to illustrate the potential savings.

Figure 4:
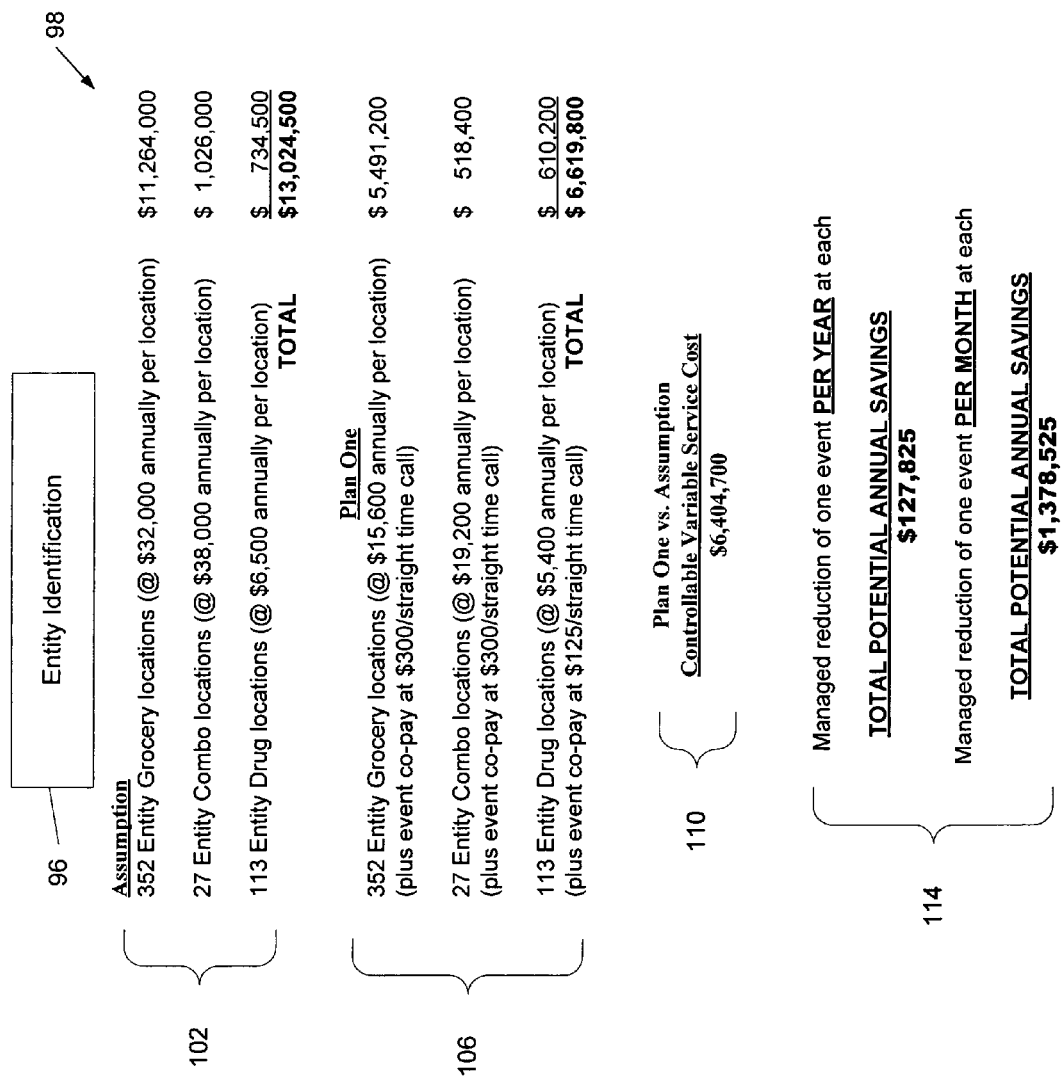
FIG. 4 is a service plan analysis report generated by the service plan system illustrated in FIG. 1.

FIG. 4 illustrates a sample service plan analysis report 98 generated by the analysis module 94. The report 98 can be generated to help illustrate potential savings through reduced service event activity. The report 98 includes an entity identification section 96, which identifies the entity for which the analysis report 98 was generated. The report 98 also includes an assumption cost section 102, which multiplies the number of specific entities by the service cost for each entity. For example, the report 98 indicates that each of 352 grocery store locations spend $32,000 on service costs and fees per year for a total of $11,264,000; each of 27 combination store locations spend $38,000 on service costs and fees per year for a total of $1,026,000; and 113 drug store locations spend $6,500 on service costs and fees per year for a total of $734,500. The assumption grand total of service costs and fees for the participants in this service plan is $13,024,500.

The report 98 also includes a service plan cost section 106, which multiplies the number of specific entities by the corresponding monthly fee from monthly fee section 70 and the event co-pay from the event co-pay section 74. For example, the cost section 106 indicates that each of the 352 grocery store locations would spend $15,600 ($1,300 each month) on service costs and fees per year for a total of $5,491,200; each of the 27 combination store locations would spend $19,200 ($1,600 each month) on service costs and fees per year for a total of $518,400; and each of the 113 drug store location would spend $5,400 ($450 each month) on service costs and fees per year for a total of $610,200. The service plan cost grand total of service costs and fees for the participants in this service plan is $6,619,800.

The report 98 includes a controllable variable service cost section 110, which indicates the difference in costs and fees between the assumption grand total and the service plan cost grand total. The controllable variable service cost can be used for service upon request from the entity. If the plan participants do not make any service requests for the year, they will have saved $6,404,700. However, in the event that service requests are needed, the report 98 includes a managed costs section 114, which provides an indication of how much can be saved by reducing the number of service requests. For example, FIG. 4 indicates that by reducing the number of service requests by one for each of the locations, the service plan would provide savings of $127,825 per year. If each of the locations reduced the number of service requests by one each month, the service plan would provide savings of $1,378,525.

Figure 5:
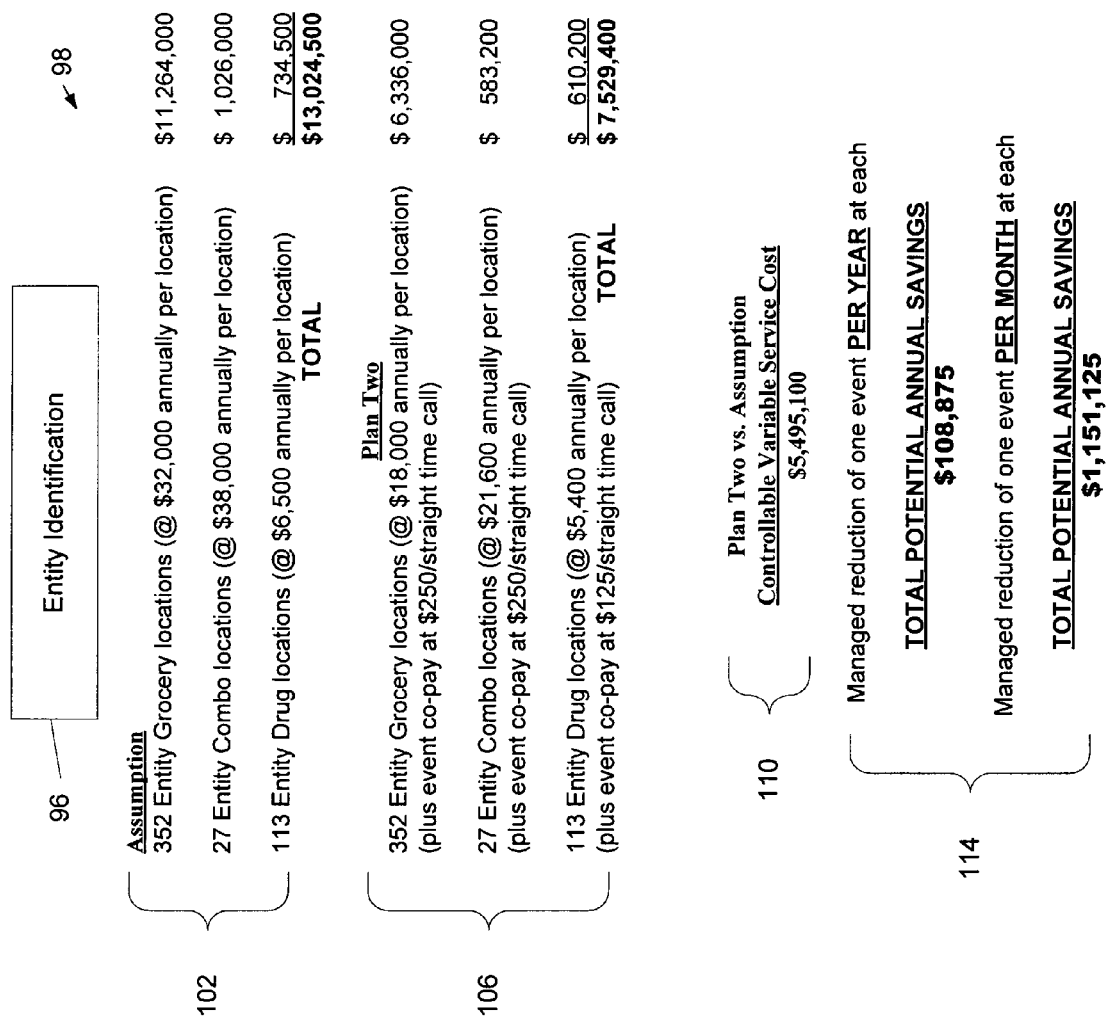
FIG. 5 is a service plan analysis report generated by the service plan system illustrated in FIG. 1.
Figure 6:
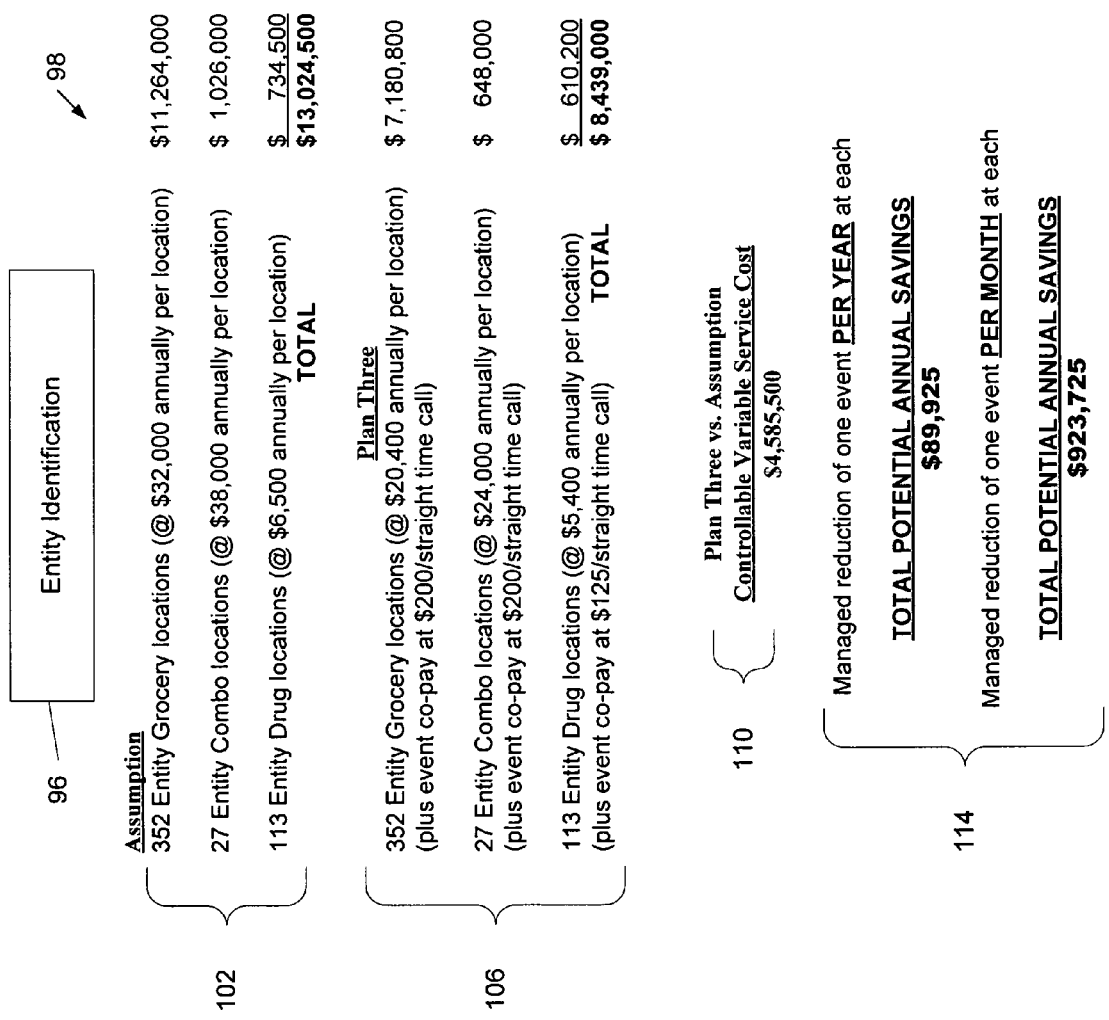
FIG. 6 is a service plan analysis report generated by the service plan system illustrated in FIG. 1.

The analysis module 94 generates a similar report 98 for each service plan using the costs and fees associated with each service plan. FIG. 5 illustrates report 98 for service plan option two. FIG. 6 illustrates report 98 for service plan option three.

FIG. 7 illustrates a service plan option report 118 generated by the service plans options module 90. The service plan report 54 (FIG. 3) indicates in the options section 82 that a flex-pay option is available. The flex pay option adjusts the amount of the monthly fee to coincide with customer cash-flow cycles. Certain types of entities perform better in some months than in other months. As illustrated in FIG. 7, the monthly fee for each service plan option is adjusted per month and the event co-pay remains the same for each month. For example, in plan option one, the normal monthly fee is $1,300 and the event co-pay is $300. If the flex pay option is used, the location pays $1,000 in January, February, March, August, and September, and pays $1,600 in April, May, June, October, November, and December. The co-pay amount remains the same for each month at $300. The total fixed cost for service plan option one remains the same under the normal option and the flex pay option.

The service plan option report 118 also illustrates a combined option plan 120 where the flex pay option is divided between service plan option one and service plan option three. The total fixed cost of the combined option plan is between the total fixed-costs for service plan option one and service plan option three.

The service plan coverage module 50 can also generate a service plan report 122 for the same entity type as illustrated in FIG. 8. The report 122 can be generated to provide potential savings through increased entity volume commitment as well as reduced service event activity. For this type of report 122, the entity type is the same, e.g., all grocery stores, all drug stores, all department stores, all hardware stores. The service plan report 122 includes an entity identification section 124, which identifies the entity for which the service plan report 122 was generated. The service plan coverage module 50 also includes a plan options section 126, which provides a service plan based on the number of entities that will participate in the service plan. The service plan report 122 also includes a monthly fee section 130, corresponding to each service plan and a co-pay event section 134 corresponding to each service plan. The service plan report 122 also includes a conditions section 138, which indicates any specific conditions of the service plans. For example, the sample report 122 indicates that the entity 124 will incur additional costs if service activity occurs after normal working hours or on holidays. The report 122 also includes an options section 142, which indicates whether any other options or programs are available to reduce costs for service. The report 122 further includes a notes section 146, which provides information to a sales or service representative when working with an entity to select the appropriate service plan.

The data in the report 122 may be analyzed by the analysis module 94 to generate a service plan analysis report 150 as illustrated in FIG. 9. The report 150 includes an entity identification section 152, which identifies the entity for which the analysis report 150 was generated. The report 150 includes the plan options section 126, which lists the plan options. The report 150 also includes a call reduction section 154, which indicates the amount saved if each entity reduces the number of service requests by one. For example, in plan option A, $75,000 would be saved, which is determined by multiplying the event co-pay amount by the number of entities. The report 150 also includes a monthly savings section 158, which indicates the amount saved on monthly fixed costs when more entities participate in the service plan. When comparing plan option A with 500 entities participating to plan option C with 1,000 entities participating, the savings in the fixed monthly cost is $300,000.

The report 122 also includes an event co-pay savings section 162, which indicates the amount saved on event co-pays when more entities participate in the service plan. When comparing plan option A with 500 entities participating to plan option C with 1,000 entities participating, the savings in the event co-pays is $140,000. The report 122 also includes a total potential savings section 166, which provides the total amount of savings by adding the amount saved on the fixed monthly cost and event co-pay. The report 122 further includes a savings summary section 170, which summarizes the potential amount saved by reducing at least one service request and by increasing the number of entities that participate in the service plan.

The simplicity of the service plans provides simplicity of invoicing as well. The invoice consolidates the monthly fees and event co-pay fees for each entity in a single invoice. The consolidated invoice offers multi-regional and national customers significantly reduced transactional and processing costs. The software program 30 can include an invoice module 174 operable to generate a single invoice for a regional or national customer.

Figure 10:
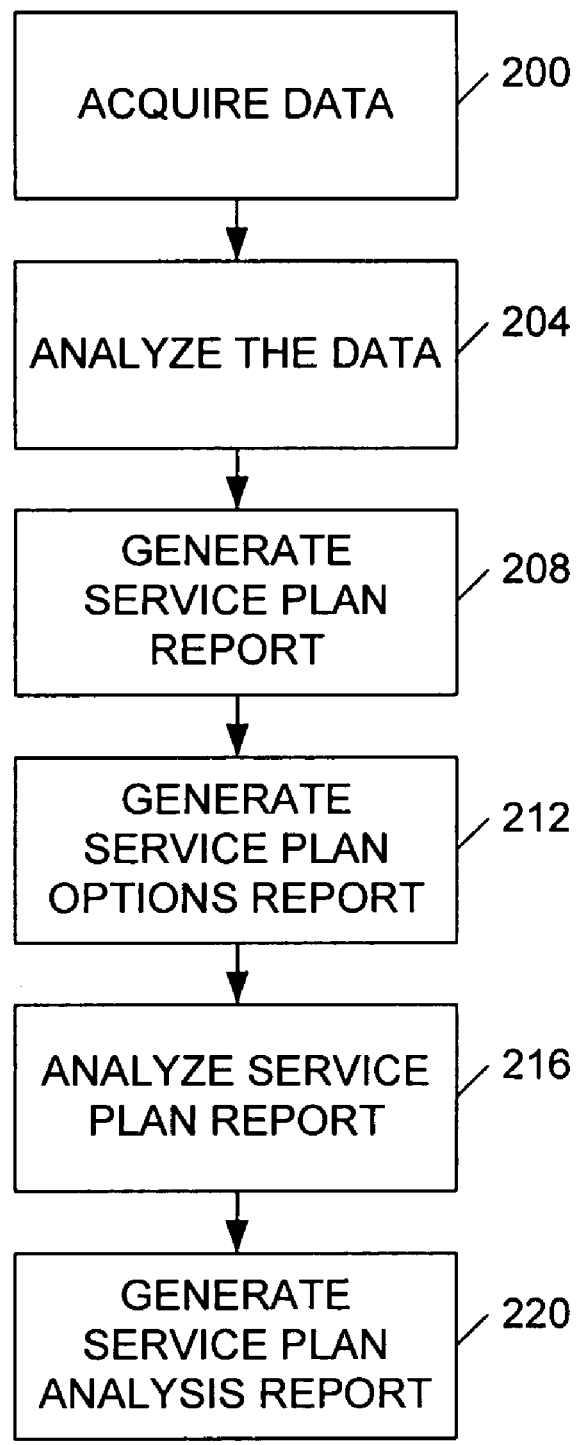
FIG. 10 is a flow chart of a method of operation of the computer program illustrated in FIG. 2 according to one embodiment of the method of the invention.

FIG. 10 illustrates a flow chart of the operation of the computer program 30 according to one embodiment of the method of the invention. In the process shown in FIG. 10, the computer program 30 acquires (at 200) the entity type data from the entity type module 34, the number of participants data from the participation module 38, the service history data of each entity from the service history activity module 42, and location data from the location module 46. The service plan coverage module 50 analyzes (at 204) the data and generates (at 208) a service plan report 54 and/or 122. The user can select the type of service plan report 54 and/or 122 desired. The service plans options module 90 generates (at 212) a service plan options report 118 if options are available on the service plan report 54 and/or 122. The analysis module 94 analyzes (at 216) the data in the service plan report 54 and/or 122 and/or the data in the service plan options report 118 and generates (at 220) one or more service plan analysis reports 98. The generated service plans can be stored in the database 26. The sales and service representatives utilize these various reports when discussing service and maintenance options with customers that purchase refrigeration systems.

Various independent features and independent advantages of the invention are set forth in the following claims.

What is claimed is:

1. A computer-implemented method of generating a service plan for a refrigeration system customer, the method comprising:
   acquiring customer type data, customer location data, and customer service history data;
   analyzing the customer type data, customer location data, and customer service history data;
   generating, by a computer system, a refrigeration system service plan report showing simultaneously first and second monthly fee amounts payable by the customer, and respective first and second event co-pay amounts, where the first and second monthly fee payment amounts are different from one another;
   determining, based on input to the computer system received from the customer, a reduced number of service calls for the refrigeration system;
   analyzing the service plan report; and
   generating, by the computer system, a service plan analysis report including a controllable variable service cost amount based on at least one of the first and second monthly fee amounts payable by the customer, and a total potential savings amount based on the reduced number of service calls for the refrigeration system.

2. The computer-implemented method of claim 1, wherein the reduced number of service calls comprises one service event per year.

3. The computer-implemented method of claim 1, wherein the reduced number of service calls comprises one service event per month per year.

4. The computer-implemented method of claim 1, wherein the customer includes a plurality of entities.

5. The computer-implemented method of claim 4, wherein the reduced number of service calls comprises one service event per year for each entity.

6. The computer-implemented method of claim 4, wherein the reduced number of service calls comprises one service event per month per year for each entity.

7. The computer-implemented method of claim 1, wherein the monthly fee varies based on customer cash flow cycles.

8. A computer program embodied by a computer readable medium capable of being executed by a computer, the computer program operable to generate a service plan for a refrigeration system customer, the computer program comprising:
   instructions to acquire customer type data, customer location data, and customer service history data;
   instructions to analyze first and second monthly fee amounts payable by the customer, and respective first and second event co-pay amounts based on the customer type data, customer location data, and customer service history data;
   instructions to determine, based on input received from the customer, a reduced number of service calls for the refrigeration system; and
   instructions to simultaneously display a plurality of refrigeration system service plans based on the first and second monthly fee amounts payable by the customer, where the first and second monthly fee amounts are different from one another, and respective first and second event co-pay amounts, each refrigeration system service plan providing a controllable variable service cost amount based on the first and second monthly fee amounts payable by the customer, and a total potential savings amount based on the customer type data and the reduced number of service calls for the refrigeration system.

9. The computer program of claim 8, wherein the reduced number of service calls comprises one service event per year.

10. The computer program of claim 8, wherein the reduced number of service calls comprises one service event per month per year.

11. The computer program of claim 8 wherein the customer includes a plurality of entities.

12. The computer program of claim 11 further comprising instructions to generate a single invoice for the customer.

13. The computer program of claim 11 wherein the different monthly fee amount and the different event co-pay amount in each service plan is further based on the number of entities participating in the service plan.

14. The computer program of claim 11 further comprising instructions to generate a service plan analysis report including a controllable variable service cost amount and a total potential savings amount.

15. The computer program of claim 14, wherein the reduced number of service calls comprises one service event per year for each entity.

16. The computer program of claim 14, wherein the reduced number of service calls comprises one service event per month per year for each entity.

17. A service plan generation system for refrigeration system customers, the service plan generation system comprising:
   a computer running a customer type module, a service history module, a location module, a service plan coverage module, and an analysis module;
   the customer type module operable to acquire data related to customer type; the service history module operable to acquire data related to the customer's service history;
   the location module operable to acquire data related to the customer's location;
   the service plan coverage module operable to receive the data from the customer type module, the service history module, and the location module and to generate a service plan report listing simultaneously first and second monthly fee amounts payable by the customers, and respective first and second event co-pay amounts, the first monthly fee being different from the second monthly fee; and
   the analysis module operable to analyze the service plan report and to generate a service plan analysis report including a controllable variable service cost amount based on the first and second monthly fee amounts payable by the customer, and a total potential savings amount, based on a reduced number of service calls with input received from the customer.

18. The system of claim 17 further comprising a participation module operable to acquire a number of entities participating in the service plan.

19. The system of claim 18 wherein the service plan report is based on the data received from the customer type module, the service history module, the location module, and the number of entities.

* * * * *